PULSE GROUP SELECTOR

Filed June 28, 1945 2 Sheets-Sheet 1

Inventor
ERNST H. KRAUSE
CLAUD E. CLEETON
By Ralph L. Chappell
Attorney

Sept. 18, 1951 E. H. KRAUSE ET AL 2,567,944

PULSE GROUP SELECTOR

Filed June 28, 1945 2 Sheets-Sheet 2

Inventor

ERNST H. KRAUSE
CLAUD E. CLEETON

By Ralph L. Chappell

Attorney

Patented Sept. 18, 1951 2,567,944

UNITED STATES PATENT OFFICE 2,567,944

PULSE GROUP SELECTOR

Ernst H. Krause, Cheverly, Md., and Claud E. Cleeton, Washington, D. C.

Application June 28, 1945, Serial No. 602,149

7 Claims. (Cl. 177—380)

(Granted under the act of March 3, 1883, as amended April 30, 1928; 370 O. G. 757)

This invention relates broadly to electronic control circuits and in particular to a selector for the control and determination of pulse group structure.

In our co-pending application Serial No. 593,174, entitled "Pulse Signalling System," filed May 11, 1945, a system of radio signalling is disclosed in which the intelligence of transmission is conveyed by the structure of a group of pulses. According to the teaching of that invention, the variation as between pulse groups consists of the differences in time occurrence of a pulse or a pluraltiy of pulses with respect to the initial pulse of the group. In such a system, it is necessary to provide means for controlling and determining pulse occurrence so as to produce a finite number of pulse group structures. Each of such structures can then be utilized to represent a detail of information in the intelligence of transmission, such as a number or a character in the alphabet or a function in a remote control system as the particular application requires.

It is therefore an object of this invention to provide a pulse group selector for controlling and determining pulse occurrence so as to produce a finite number of pulse group structures.

It is another object of this invention to provide a means for producing a group of pulse signals wherein the number and relative time occurrence of the pulse signals are selectively determined.

It is another object of this invention to provide a means whereby a group comprising a finite series of pulses equally spaced in time may be altered by the suppression of members of the series so as to vary selectively the group structure.

Other objects and features of this invention will become apparent upon a careful consideration of the following detailed description when taken together with the accompanying drawings in which.

Since certain components of the pulse signaling system disclosed in our application, supra, may be utilized in connection with the present invention, reference is made thereto, but with the understanding that no limitation of use is implied thereby. In that system, a group of two or more electrical impulses is transmitted over a given time interval. The desired message is conveyed by the arrangement of the electrical impulses comprising the group with respect to the start of the interval of group transmission. The group structure, that is, the disposition of impulses in the group, may be altered according to the information it is desired to send. A timing device is employed at the transmitting source to provide a time pattern from which the group structure to be transmitted is formed and another timing device is employed at the receiving end to provide a pattern into which the received group is fitted for translation into intelligence. The transmitter timing device and the receiver timing device are cooperative in their actions in that the operation of the latter is initiated in a definite time relation to the operation of the former and the two generate time bases, the unit intervals of which bear substantially constant and definite relationship to each other.

Figure 1:
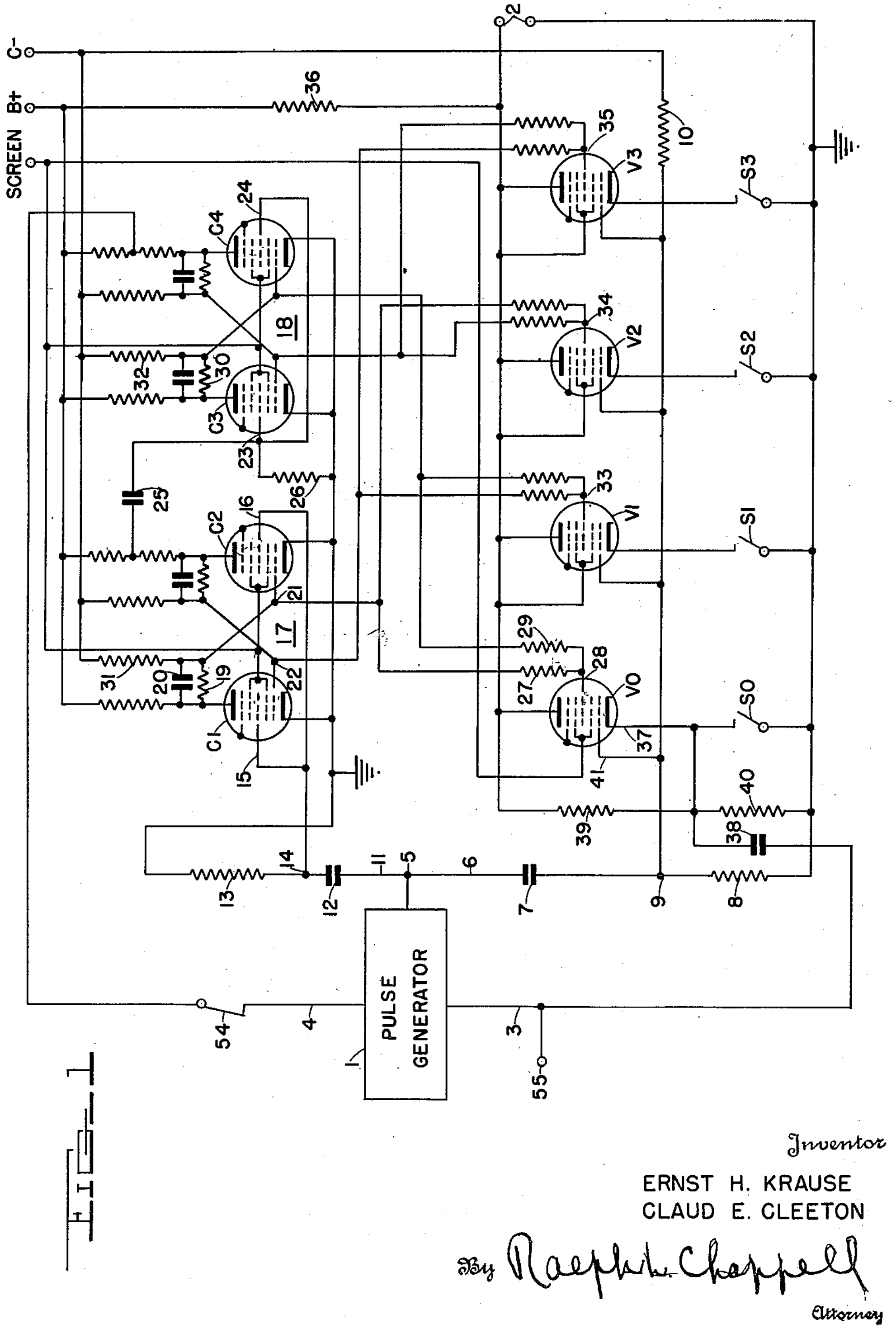
Fig. 1 is the circuit diagram of one embodiment of this invention.

In general this embodiment of our present invention comprises a means of arranging the pulses within the time pattern in a selectable manner. In Fig. 1 the feature of selectability is provided by switches S1, S2 and S3, each of which controls the introduction of a pulse signal into a pulse group time pattern generated by pulse generator 1. By closing one, two or three of the switches, a total of seven different pulse combinations is thus available for introduction into the group which appears at terminal 2 and is applied to and keys a transmitter (not shown) in accordance with its structure.

In particular, pulse generator 1 is rendered operable only by the application of a negative trigger pulse applied through lead 3 and is rendered inoperable only by a negative trigger pulse applied through lead 4. When activated by a negative trigger through lead 3, there is caused to appear at output 5 a series of rectangular positive pulses of equal time duration and equal spacing in a manner which is described in co-pending application Serial No. 595,222, entitled "Controllable Pulse Generator" by Harold Lyons, filed May 22, 1945, now Patent 2,475,625, issued July 12, 1949.

The rectangular pulse output of pulse generator 1 is applied in parallel to two separate low time constant series circuits of resistance and capacitance so that there appears at the juncture of the resistance and capacitance in each circuit a series of alternately positive and negative sharp pulses. The series of sharp pulses appearing at the juncture of one of the RC circuits provides the input to a device responsive only to the positive peaks and the series appearing at the juncture of the other RC circuit is applied to a device responsive only to the negative peaks.

In Fig. 1, the output of pulse generator 1 is applied, through lead 6 to the RC differentiating circuit comprising capacitor 7 and resistance 8 so that the alternate positive and negative peaks appear at juncture 9 and are applied to the first control grids of tubes V0, V1, V2 and V3 in parallel. Juncture 9, however, is held at a potential by connection to C— potential through resistance 10 such that plate current flow is prevented in the V series tubes when pulse generator 1 is quiescent. Thus the negative peaks serve only to increase the common bias and are therefore impotent whereas the positive peaks decrease the bias and thereby permit conduction by the V series tubes insofar as their first control grids are concerned.

The output of pulse generator 1 is also applied, through lead 11, to the RC differentiating circuit comprising capacitor 12 and resistance 13 so that like alternate positive and negative peaks appear at juncture 14 and are applied in parallel to second control grids 15 and 16 of tubes C1 and C2. C1 and C2 represent the vacuum tube components of the first stage of a two stage scale-of-four electronic counter which is so designed as to be responsive only to negative signals as hereinafter explained. In this case, therefore, it is the positive peaks which are impotent and the negative peaks which are effective.

The C series tubes and associated circuit components constitute a conventional type scale-of-four electronic counter comprising two scale-of-two stages, 17 and 18, connected in cascade. First stage 17 consists of multigrid tubes C1 and C2, connected so that the output from C1 is coupled through resistor 19 shunted by capacitor 20 to the first control grid 21 of C2, while the output of C2 is similarly coupled back to first control grid 22 of C1. In the second counter stage 18, which consists of C3 and C4, the corresponding tube elements are connected in the same manner as in first stage 17. In this way each stage is directly connected in a regenerative manner so that one tube in each stage will be conducting and the other tube non-conducting and in which condition the stage will remain until the conducting tube is rendered non-conducting by an external signal. Such a signal will be regeneratively amplified until the conditions of the stages are reversed. The input to first stage 17 is obtained from pulse generator 1, while the input to second stage 18 is obtained from a tap in the plate load resistance of C2 and applied in parallel to second control grids 23 and 24 of C3 and C3 through a low time constant circuit consisting of capacitor 25 and resistor 26. The function of this coupling circuit is to apply to grids 23 and 24 a negative pulse each time C2 passes from non-conduction to conduction. The positive pulse which is applied to grids 23 and 24 when C2 is rendered non-conducting is impotent by virtue of the fact that it has no effect on the tube which is conducting and is unable to start current flow in the non-conducting tube which is cut off by the bias on its first control grid.

By constructing a counter circuit with multigrid tubes as shown, each stage is made to respond only when a negative impulse is applied to its first control grids, so a total of four negative impulses are required at input 14 to cause the circuit to pass through a complete cycle of operation.

Such a complete cycle of operation involves four distinct potential states characterized by the particular C series tubes which are conducting and non-conducting which can be integrated in a manner described in co-pending application Serial No. 582,964, entitled "Electronic Integrating System" by Ernst H. Krause, filed March 15, 1945. This integration is here accomplished by interconnection between the counter stage tubes so that advantage is taken of the fact that the higher of the two distinct voltage levels existing at the plates of the C series tubes as the counter goes through its cycle only occurs simultaneously at the plates of any two of the tubes during one state of the counter's four states.

This is typified in Fig. 1 by the connection of the plate of C1 through resistance 19, resistance 27 at the grid 28 of V0, resistance 29 and resistance 30 to the plate of C3 so that there appears at grid 28 of V0 a maximum positive potential during only one state of the counter cycle, i. e., when C1 and C3 are both non-conducting. Since the circuit of interconnection is also connected to a source of C— potential through resistors 31 and 32, and a cutoff bias is ordinarily thus applied to grid 28 of V0, this maximum positive potential is required at grid 28 before plate current can flow in that tube. Likewise, V1, V2 and V3 are rendered capable of conducting insofar as their control grids are concerned each during a different one of the other three counter states. Their respective connections to the counter are such that the V0, V1, V2 and V3 are unbiased in that order as the counter goes through its cycle.

The plate circuit of C4 is connected by means of lead 4 to pulse generator 1, in such a manner that the output at point 5 ceases when C4 is rendered conducting and its plate experiences a negative excursion of voltage. The counter is always thereby left in the same state when pulse generator 1 is rendered inoperative. This state is characterized by the non-conduction of C1 and C3 which in turn causes the bias to be removed from grid 28 of V0. Thus, as the counter is fed negative peaks at juncture 14, V0 is unbiased at grid 28 prior to the first of such negative peaks, V1 is unbiased at grid 33 during the time interval marked by the first and second negative peaks, V2 is unbiased at grid 34 during the time interval between the second and third negative peaks and V3 is unbiased at grid 35 during the time interval between the third and fourth negative peaks. The negative peak which marks the end of the interval during which V3 is unbiased at grid 35 renders V0 again capable of conduction at grid 28 and stops pulse generator 1. The time base which is constituted by intervals marked by the different counter states thereby influences the V series tubes so as to render a different V series tube capable of conducting during a different one of the time base intervals.

On the other hand the positive peaks which are advanced in time from the negative peaks by the time length of the output pulses from the pulse generator 1 are applied at juncture 9 and remove the bias from the first control grids of all of the V series tubes each time a pulse appears at the output from the generator 1. The first of such positive peak pulses will arrive to find the bias removed from second control grid 28 of V0 and it will render V0 conducting provided switch S0 in its cathode circuit is closed. The next positive peak pulse will arrive to find only V1 capable of conducting insofar as its second control grid is concerned. The third positive peak pulse will arrive at the V series tubes to find only tube V2 capable of conducting and so on. The positive peak pulse which arrives to find V3 unbiased will, of course, be followed by the blocking of pulse generator 1. Each time a positive peak pulse causes a V series tube to conduct, current is thereby drawn from B+ through resistor 36 and a negative pulse appears at terminal 2 which can be utilized, as in this embodiment, to key a transmitter (not shown). It is necessary to apply a negative pulse through a lead 3 to the pulse generator in order to initiate the generation of the time bases. This is accomplished in the present embodiment by connecting lead 3 to the cathode 37 of V0 through capacitor 38. With switch S0 open, cathode 37 is held well above a potential which will permit V0 to conduct by virtue of its connection to B+ through resistors 39 and 36 and its connection to ground through resistor 40. When S0 is closed, cathode 37 goes to ground potential and this negative excursion of voltage, communicated to pulse generator 1 via lead 3, starts the time base production. It can be seen that the closing of S1, S2 or S3 has no such effect on the pulse generator and that these may be closed in a selectable manner to provide the desired pulse group structure after which S0 may be closed and the pulse group selector caused to proceed through its cycle.

Let it be assumed that pulse generator 1 has a frequency of ten kilocycles per second and that the width of the pulses is the same as the spacing between the pulses. Thus, both pulse width and pulse spacing have a duration of 50 microseconds. Further, let it be assumed that a pulse group is to be selected which is comprised of a zero or initial pulse separated in time from a following pulse by a 100 microsecond time interval. The operator therefore closes S1 and then closes S0 and starts pulse generator 1. V0, which is capable of conducting with respect to its second control grid 28, is immediately rendered conducting by first control grid 41 for the duration of the first positive peak pulse and a sharp negative pulse therefore appears at terminals 2. 100 microseconds later V1 conducts and a second pulse appears at terminals 2. This completes the group structure since S2 and S3 remain open. If the operator had desired a 200 microsecond separation, S2 rather than S1 would have been closed. If a pulse group having four pulses each separated by 100 microseconds, S1, S2 and S3 would have been closed. If the single pulse group selected when only S0 is closed be ignored, seven different pulse group structures are available to the operator simply by proper choice of switches S1, S2 and S3.

Figure 2:
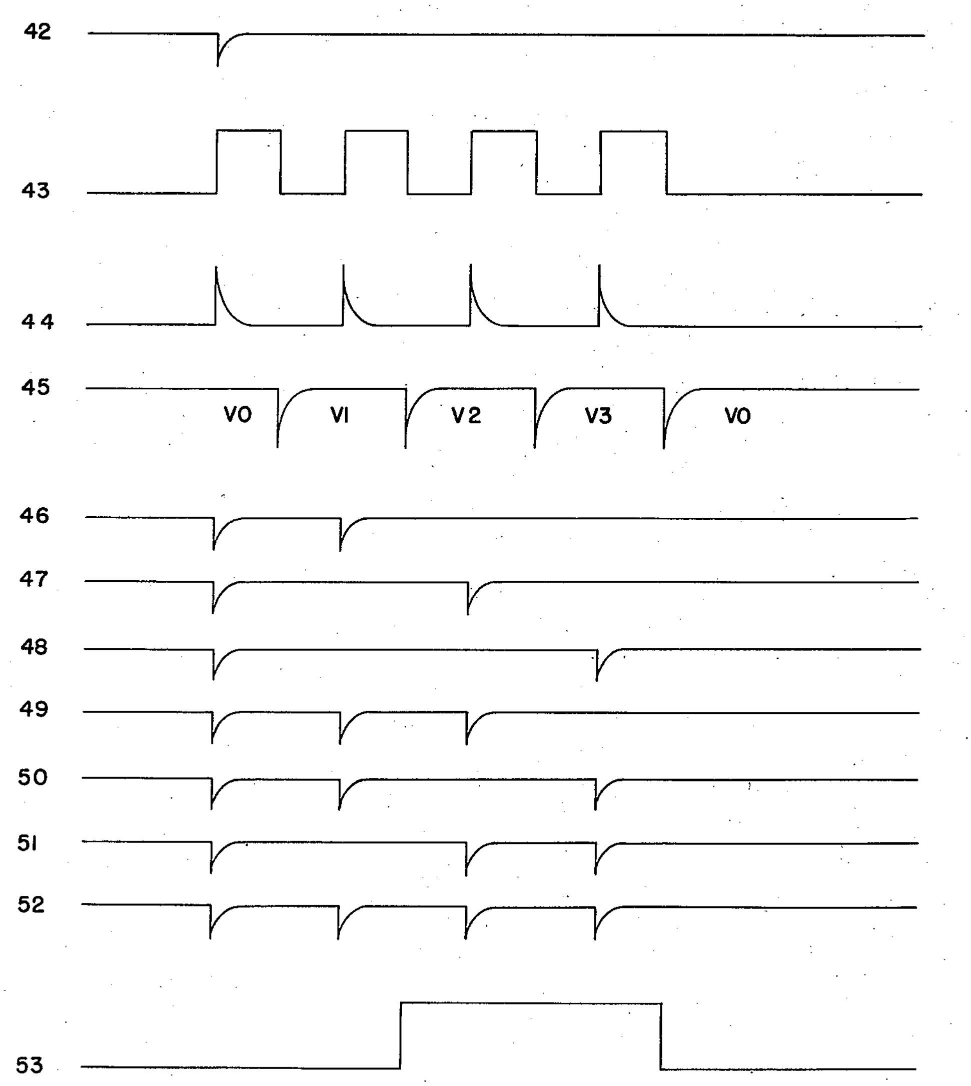
Fig. 2 is a series of waveforms useful in explaining the operation of the circuit of Fig. 1.

In Fig. 2, waveform 42 is representative of the negative pulse reaching pulse generator 1 through lead 3 and waveform 43 is representative of the rectangular positive pulse output of the generator which appears at point 5. The positive peak pulses which govern the first control grids of the V series is represented by waveform 44 and the negative peak pulses which govern the counter is illustrated by waveform 45. In both of these waveforms the peaked elements, positive or negative as the case may be, which are impotent, are not shown. In the time intervals marked by the negative peaks of waveform 45 have been noted the particular V series tube which is rendered conducting at its second control grid by the counter. Waveforms 46 through 52 represent the seven possible pulse group structures described above. The variation at the plate of C4 which results in stopping pulse generator 1 when C4 is rendered conducting is illustrated by waveform 53.

It can be seen that, had switch 54 in lead 4 of pulse generator 1 been left open, the pulse group appearing at terminals 2 would have repeated itself automatically. Under these conditions the closing of S2 and S0 would have resulted in the continuous production of a series of negative pulses at a frequency of 5000 per second.

It can also be seen that, if a series of negative signals is introduced at terminal 55 from an external source, a pulse group having the selected structure will appear at terminals 2 in response to each such negative signal provided, of course, that there is a separation between the negative pulses sufficient to permit the selector to go through its cycle. In the embodiment shown, using a ten kilocycle pulse generator frequency, the separation required would be 350 microseconds corresponding to a maximum rate of approximately 2800 per second.

The seven different group structures provided by the circuit of Fig. 1 can, by the use of three stage scale-of-eight counter and four more V series tubes, be increased to one hundred twenty seven different pulse group structures.

Neither the type of pulse generator herein referred to as pulse generator 1, nor the frequency of operation is a limiting feature of this invention. Insofar as the pulse generator is concerned, it need only be capable of producing pulses of steep leading and trailing edges in any desired sequence. Neither the time spacing between nor the duration of pulses need be equal, their having been shown as such so as to simplify the nature of the time base generated. The frequency of operation can range from a few cycles per second up into the megacycle region as required by the particular application.

The counter, which is herein represented by multi-grid tubes C1, C2, C3 and C4 is merely a convenient method of providing a plurality of different states in response to a controlling time base. There are several well known electronic counters which would serve equally well, some of which employ slightly different circuit connections and some of which employ triodes or other classes of vacuum tubes.

The simple on-off switches used to ground the cathodes of the various V series tubes, herein represented by S0, S1, S2, and S3 may be replaced by push button or other mechanical switches or by electronic switching means. The switches may be interconnected so as to permit the selection of any possible pulse group by a single switch closure the embodiment having been shown in a simple form for purposes of illustration.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. Apparatus for producing a group of pulses wherein the number and relative time occurrence of the pulse signals in said group are selectively determined, comprising a means generating a time base which is comprised of a finite number of voltage pulses, each of which is predeterminedly spaced in time, a plurality of vacuum tubes, means connecting each of said tubes to said first named means in such a manner as to render a different one of said tubes operative in response to each of said voltage pulses, and separate means associated with each of said tubes and arranged to render any one or number of said tubes unresponsive to said first named means whereby any one or number of the voltage pulses from said first named means may be suppressed from the output of said tubes.

2. Apparatus for producing a group of pulses wherein the number and relative time occurrence of the pulse signals in said group are selectively determined, comprising a means generating a time base which is comprised of a finite number of voltage pulses, each of which is predeterminedly spaced in time, a plurality of vacuum tubes, counter means connecting each of said tubes to said first named means in such a manner as to render a different one of said tubes operative in response to each of said voltage pulses, and separate means associated with each of said tubes and arranged to render any one or number of said tubes unresponsive to said first named means whereby any one or number of the voltage pulses from said first named means may be suppressed from the output of said tubes.

3. A means for producing a group of pulses wherein the number and relative time occurrence of the pulse signals in said group are selectively determined, comprising a plurality of the scale-of-two type counter stages connected in cascade so as to form a counter circuit the cycle of operation of which comprises a plurality of different potential states, a plurality of vacuum tubes, said counter circuit associated with each of said tubes in such a manner as to render a different one of said tubes operative for the duration of each of said potential states as said counter circuit passes through a cycle of operation, a pulse generator, means connecting the output of said pulse generator to said counter circuit, means also connecting the output of said pulse generator to said vacuum tubes in parallel, and separate means associated with each of said tubes and arranged to render any one or number of said tubes unresponsive to the action of said counter circuit whereby any one or number of pulse signals from said pulse generator may be suppressed from the output of said tubes.

4. A means for producing a group of pulses wherein the number and relative time occurrence of the pulse signals in said group are selectively determined, comprising a plurality of the scale-of-two type counter stages connected in cascade so as to form a counter circuit the cycle of operation of which comprises a plurality of different potential states, a plurality of vacuum tubes, equal in number to the number of said potential states, said counter circuit associated with each of said tubes in such a manner as to render a different one of said tubes operative for the duration of each of said potential states as said counter circuit passes through a cycle of operation, a pulse generator, means connecting the output of said pulse generator to said counter circuit, means also connecting the output of said pulse generator to said vacuum tubes in parallel, and separate switching means associated with each of said tubes and arranged to render any one or number of said tubes unresponsive to the action of said counter circuit whereby any one or number of pulse signals from said pulse generator may be suppressed from the output of said tubes.

5. A means for producing a group of pulses wherein the number and relative time occurrence of the pulse signals in said group are selectively determined, comprising a plurality of the scale-of-two type counter stages connected in cascade so as to form a counter circuit the cycle of operation of which comprises a plurality of different potential states, a plurality of vacuum tubes, each of which has at least an anode, a cathode, and a pair of control grids, one of said control grids of each of said tubes connected to said counter circuit in such a manner that said counter circuit will function to render a different one of said tubes operative for the duration of each of said potential states as said counter circuit passes through a cycle of operation, a pulse generator, means connecting the output of said pulse generator to said counter circuit, means also connecting the output of said pulse generator to the other control grid of each of said tubes in parallel, and separate means associated with each of said tubes and arranged to render one or any number of said tubes unresponsive to the action of said counter circuit whereby any one or number of pulse signals from said pulse generator may be suppressed from the output of said tubes.

6. A means for producing a group of pulses wherein the number and relative time occurrence of the pulse signals in said group are selectively determined, comprising a plurality of the scale-of-two type counter stages connected in cascade so as to form a counter circuit the cycle of operation of which comprises a plurality of different potential stages, a plurality of vacuum tubes, equal in number to the number of said potential states each of which has at least an anode, a cathode, and a pair of control grids, one of said control grids of each of said tubes connected to said counter circuit in such a manner that said counter circuit will function to render a different one of said tubes operative for the duration of each of said potential states as said counter circuit passes through a cycle of operation, a pulse generator, means connecting the output of said pulse generator to said counter circuit, means also connecting the output of said pulse generator to the other control grid of each of said tubes in parallel, and separate switching means associated with each of said tubes, and arranged to render one or any number of said tubes unresponsive to the action of said counter circuit whereby any one or number of pulse signals from said pulse generator may be suppressed from the output of said tubes.

7. A pulse group selector, comprising means generating a time base which consists of a series of voltage pulses of alternately opposite polarity, a plurality of vacuum tube means arranged to respond and amplify only those of said voltage pulses of one polarity, means responsive only to said voltage pulses of the opposite polarity for successively rendering said vacuum tube means operative during each of the intervals between successive pulses of said opposite polarity, and means for rendering any one or number of said vacuum tube unresponsive to the action of said last named means.

ERNST H. KRAUSE.
CLAUD E. CLEETON.

REFERENCES CITED

The following references are of record in the file of this patent:

UNITED STATES PATENTS

| Number | Name | Date |
|---|---|---|
| 2,048,081 | Riggs | July 21, 1936 |
| 2,272,070 | Reeves | Feb. 3, 1942 |
| 2,365,450 | Bliss | Dec. 19, 1944 |
| 2,403,561 | Smith | July 9, 1946 |

FOREIGN PATENTS

| Number | Country | Date |
|---|---|---|
| 355,705 | Great Britain | Aug. 24, 1931 |